(12) United States Patent
Tsukahara et al.

(10) Patent No.: US 9,122,093 B2
(45) Date of Patent: Sep. 1, 2015

(54) OPTICAL MEMBER AND DISPLAY DEVICE

(75) Inventors: Tsubasa Tsukahara, Tokyo (JP); Ryo Kasegawa, Chiba (JP); Yasushi Ito, Kanagawa (JP); Naoji Nada, Kanagawa (JP)

(73) Assignee: DEXERIALS CORPORATION, Tokyo (JP)

( * ) Notice: Subject to any disclaimer, the term of this patent is extended or adjusted under 35 U.S.C. 154(b) by 276 days.

(21) Appl. No.: 12/687,443

(22) Filed: Jan. 14, 2010

(65) Prior Publication Data

US 2010/0187975 A1 Jul. 29, 2010

(30) Foreign Application Priority Data

Jan. 26, 2009 (JP) ................................ P2009-014628

(51) Int. Cl.
G02F 1/01 (2006.01)
G02F 1/1335 (2006.01)
F21V 8/00 (2006.01)

(52) U.S. Cl.
CPC ........ G02F 1/133603 (2013.01); G02B 6/0038 (2013.01); G02F 1/133606 (2013.01); G02F 2001/133614 (2013.01)

(58) Field of Classification Search
CPC .................... G02F 1/133606; G02F 1/133609
USPC .................... 250/448.1, 458.1; 313/473, 116
See application file for complete search history.

(56) References Cited

U.S. PATENT DOCUMENTS

| 5,771,039 A | * | 6/1998 | Ditzik ........................... 345/178 |
| 6,072,445 A | * | 6/2000 | Spitzer et al. ..................... 345/8 |
| 6,424,403 B1 | * | 7/2002 | Leenhouts et al. ............. 349/199 |
| 6,476,783 B2 | * | 11/2002 | Matthies et al. ................. 345/82 |
| 2005/0007000 A1 | * | 1/2005 | Chou et al. ..................... 313/116 |
| 2007/0057626 A1 | * | 3/2007 | Kurihara et al. .............. 313/503 |

FOREIGN PATENT DOCUMENTS

| JP | 59-42500 | 3/1984 |
| JP | H06-58440 B2 | 5/1989 |
| JP | 6-58440 | 5/2001 |
| JP | 3105529 U | 11/2004 |
| JP | 2005-108635 | 4/2005 |
| JP | 2007-23267 | 2/2007 |
| JP | A-2008-123969 | 5/2008 |
| JP | A-2008-299117 | 12/2008 |

OTHER PUBLICATIONS

Japanese Patent Office, Notification of Reason(s) for Refusal mailed Jan. 29, 2013 in Japanese Patent Application No. 2009-014628 w/English-language Translation.
Dec. 2, 2014 Office Action issued in Japanese Application No. 2009-014628.

* cited by examiner

*Primary Examiner* — Nimeshkumar Patel
*Assistant Examiner* — Christopher Raabe
(74) *Attorney, Agent, or Firm* — Oliff PLC (57) ABSTRACT

An optical member realizing suppressed occurrence of a light loss between a phosphor layer performing color conversion and itself, and a display device using the same is provided. The optical member includes a base member having two opposed surfaces, and a phosphor layer provided integrally with one surface of the base member and containing a phosphor that converts a color light to another color light.

1 Claim, 9 Drawing Sheets

OPTICAL MEMBER AND DISPLAY DEVICE

CROSS REFERENCES TO RELATED APPLICATIONS

The present application claims priority to Japanese Priority Patent Application JP 2009-014628 filed in the Japanese Patent Office on Jan. 26, 2009, the entire content of which is hereby incorporated by reference.

BACKGROUND

The present application relates to an optical member for use in a liquid crystal display or the like, and a display device.

As a thin-type display device, a liquid crystal display (LCD) is used. In a liquid crystal display, a backlight for illuminating the entire plane of a liquid crystal panel from the back is used. Depending on the structure of the backlight, liquid crystal displays are roughly divided into the direct light type and the edge light type. The edge light type uses a light guide plate in which a light emitting element is disposed for a side face. Light entering from the side face of the light guide plate is allowed to propagate in the light guide plate and is extracted from the top face of the light guide plate. On the other hand, the direct light type performs plane emission by, for example, disposing a plurality of fluorescent tube lamps such as CCFLs (Cold Cathode Fluorescent Lamps) on a substrate (see, for example, Japanese Unexamined Patent Application Publication No. 2005-108635 (patent document 1)).

In recent years, as a liquid crystal display is becoming larger, thinner, lighter, and longer lasting, from the viewpoint of improvement in motion picture characteristics by blinking control, attention is being paid to a light emitting device performing plane emission by disposing a plurality of light emitting diodes (LEDs) on a substrate. In such a light emitting device, to extract white color, the following two methods are mainly used. In the first method, light emitting diodes for emitting light of three colors of R, G, and B are disposed and turned on simultaneously, thereby synthesizing the light of the three colors. In the second method, for example, a blue light emitting diode chip is surrounded by a phosphor layer which performs color conversion. By mixing color light obtained by the conversion in the phosphor layer and blue light, which passed through the phosphor layer without being converted, white light is obtained.

Recently, attention is being paid to, as a third method, a method of performing plane emission by disposing a plurality of blue light emitting diode chips on a substrate and providing a sheet-shaped phosphor layer (phosphor sheet) on the blue light emitting diode chips.

The phosphor as described above is generally weak to oxygen and moisture vapor and, when it is exposed to oxygen, moisture vapor, or the like, the phosphor deteriorates. Accordingly, the color conversion efficiency of the phosphor decreases, and luminance and chromaticity of the backlight deteriorates. Such deterioration in the phosphor is conspicuous particularly under high-temperature high-moisture environments.

To address the deterioration, a method of improving moisture vapor transmittance and gas permeability of a phosphor sheet itself (see Japanese Examined Patent Application Publication No. H06-58440 (patent document 2)) and a method of applying an application liquid for protection onto the surface of a phosphor sheet (see Japanese Unexamined Patent Application Publication No. S59-42500 (patent document 3)) are proposed. A method of sandwiching a phosphor sheet by two glass plates and sealing the phosphor sheet is also proposed (see Japanese Unexamined Patent Application Publication No. 2007-23267 (patent document 4)). Such a phosphor sheet is used by being stacked together with a diffusion plate, a diffusion film, a lens film, and the like between a liquid crystal panel and a light source of a blue light emitting diode or the like

SUMMARY

However, in the case of disposing a phosphor sheet on a liquid crystal display according to the methods of the patent documents 2 to 4, in a layer stack structure between the light source and the liquid crystal panel, an air layer is interposed between the phosphor sheet and another optical member adjacent to the phosphor sheet. Due to interposition of the air layer, the refractive index difference when light enters from the another optical member to the phosphor sheet or when light enters from the phosphor sheet to the another optical member is large, and there is a shortcoming that light loss occurs.

It is therefore desirable to provide an optical member realizing suppression of occurrence of light loss between a phosphor layer performing color conversion and itself, and a display device using the optical member.

According to an embodiment, there is provided an optical member including: a base member having two opposed surfaces; and a phosphor layer provided integrally with one surface of the base member and containing a phosphor that converts a color light to another color light. The phosphor layer is provided directly on one surface of the base member, or adhered to one surface of the base member in a state where the phosphor layer is sandwiched by a pair of protection layers.

According to an embodiment, there is provided a display device including: the optical member of the embodiment of the invention; and a display panel displaying an image by using light passed through the optical member.

In the optical member and the display device of embodiment, when one color light enters the phosphor layer, a part of the incident light is converted to another color light by the phosphor contained in the phosphor layer. Consequently, the color light which passes through the phosphor layer without being color-converted and the color light subjected to the color conversion in the phosphor layer are mixed. By the mixture, for example, white light is obtained. By providing such a phosphor layer integrally with the base material, that is, providing the phosphor layer directly on the base material or adhering the phosphor layer by an adhesive layer, the refractive index difference between the phosphor layer and the base member becomes smaller than that in the case where the air layer is interposed.

According to the optical member of the embodiment, the phosphor layer is provided integrally with the base material. Consequently, in a process that light passes from the base member to the phosphor layer or from the phosphor layer to the base member, light reflection in the interface is reduced as compared with the case where an air layer is interposed. Therefore, occurrence of light loss with the phosphor layer performing color conversion is suppressed. Thus, in the display device of the embodiment of the invention, reduction in luminance is suppressed.

Additional features and advantages are described herein, and will be apparent from the following Detailed Description and the figures.

DETAILED DESCRIPTION

The present application will be described in detail below with reference to the drawings, according to an embodiment. Description will be given in the following order.

(1) First Embodiment: example of providing a phosphor layer directly on a light emitting surface of a diffusion plate (2) Modification 1: example of providing a phosphor layer directly on a light incidence surface of the diffusion plate (3) Modification 2: example of providing the phosphor layer directly on a light emitting surface of a light guide plate (4) Modification 3: example of providing the phosphor layer directly on the bottom of the light guide plate (5) Modification 4: example of providing the phosphor layer directly on a light incidence surface (side face) of the light guide plate (6) Second Embodiment: example of adhering a phosphor sheet on the light emitting surface of the diffusion plate (7) Modification 5: example of adhering a phosphor sheet on the light incidence surface of the diffusion plate (8) Modification 6: example of adhering a phosphor sheet on the light emitting surface of the light guide plate First Embodiment 1. Configuration of Display Device 1

Figure 1:
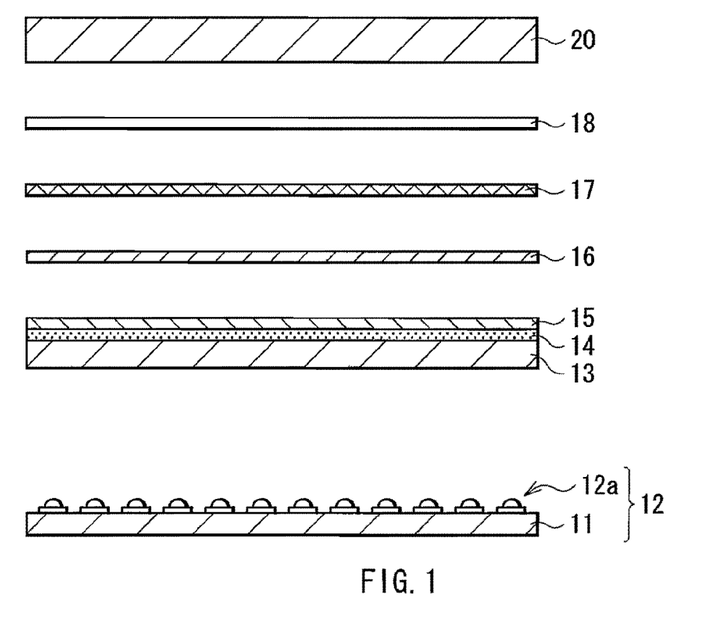
FIG. 1 is a schematic diagram illustrating a sectional configuration of a display device according to a first embodiment.

FIG. 1 schematically illustrates a sectional configuration of a display device 1 according to a first embodiment. The display device 1 is, for example, a liquid crystal display or the like and has a display panel 20 and a light source 12 as a backlight for illuminating the display panel 20. Between the display panel 20 and the light source 12, a diffusion plate 13 (base member), a phosphor layer 14, a protection layer 15, a diffusion film 16, a lens film 17, and a reflection-type polarization film 18 are stacked in order from the light source 12 side. In such a stack structure, the phosphor layer 14 is provided directly on the surface (light emitting surface) of the diffusion plate 13, and the protection layer 15 is formed on the surface of the phosphor layer 14.

The light source 12 is formed by disposing a plurality of LEDs 12a on a substrate 11, and the diffusion plate 13 is disposed on the light emitting side of the light source 12. The LEDs 12a is constructed by, for example, a blue light emitting diode or the like. The diffusion plate 13 and the phosphor layer 14 which are integrated correspond to an example of the optical member of the present invention. A concrete configuration of the diffusion plate 13 and the phosphor layer 14 will be described below.

The diffusion plate 13 diffuses incident light from the back face to uniformize intensity distribution. Examples of a material used for the diffusion plate 13 include, from the viewpoints of transparency, workability, heat resistance, and the like, for example, thermoplastic resins such as polycarbonate (PC), polyethylene terephthalate (PET), polyethylene naphthalate (PEN), polystyrene (PS), polyether sulfone (PES), cyclic amorphous polyolefin, polyfunctional acrylate, polyfunctional polyolefin, unsaturated polyester, epoxy resin, and the like. In particular, a material whose deterioration by a blue light emission diode or near-ultraviolet light emitting diode is slight is desirable. The thickness of the diffusion plate 13 is, for example, about 1 mm to 3 mm both inclusive.

Figure 2:
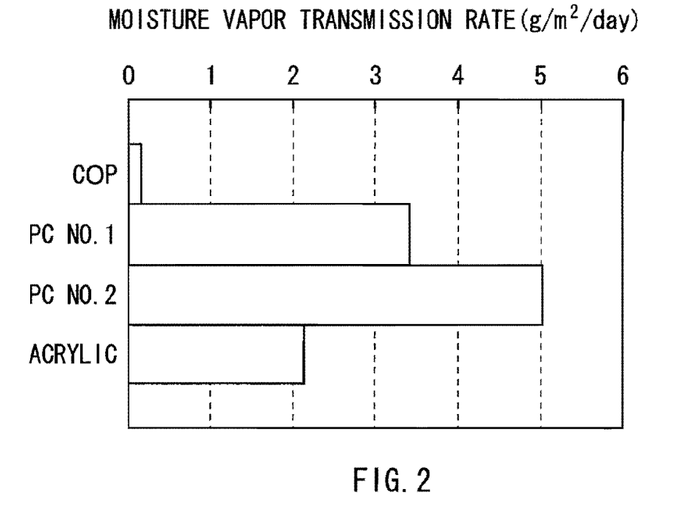
FIG. 2 is a diagram illustrating moisture vapor transmission rate of a material of a diffusion plate illustrated in FIG. 1.

FIG. 2 illustrates moisture vapor transmission rate ($g/m^2$/day) at thickness of 2 mm in cycloolefin resin (COP), polycarbonates 1 and 2, and acrylic resin. In all of the resin materials, the moisture vapor transmission rate is 10 $g/m^2$/day or less. It is understood that sufficient glass barrier property is displayed by the thickness. That is, in the diffusion plate 13, the gas barrier property is displayed by the thickness of the resin material and, therefore, the diffusion plate 13 also plays the role of a protection layer of the phosphor layer 14.

The phosphor layer 14 includes a phosphor that converts incident color light to color light having a longer wavelength band. In the case of using a blue light emitting diode as the LED 12a, a phosphor that is excited by blue light and generates green light, red light, yellow light, or the like is contained at a proper compounding ratio. Examples of the yellow-conversion phosphor include $(Y,Gd)_3(Al,Ga)_5O_{12}:Ce^{3+}$ (commonly called YAG:$Ce^{3+}$), and $\alpha$-SiAlON:$Eu^{2+}$. Examples of a yellow or green conversion phosphor include (Ca, Sr, Ba)$_2$SiO$_4$:$Eu^{2+}$. Examples of a green-conversion phosphor include SrGa$_2$S$_4$:$Eu^{2+}$ and Ca$_3$Sc$_2$Si$_3$O$_{12}$:$Ce^{3+}$. Examples of a red-conversion phosphor include (Ca, Sr, Ba)S:$Eu^{2+}$, (Ca, Sr, Ba)$_2$Si$_5$N$_8$:$Eu^{2+}$, and CaAlSiN$_3$:$Eu^{2+}$. Such a phosphor layer 14 is formed by printing or applying a material obtained by mixing the phosphor in a solvent directly on the surface of the diffusion plate 13 and drying.

The protection layer 15 is made of a material having the gas barrier property such as moisture vapor or oxygen. The protection layer 15 has a structure in which an inorganic layer made of silicon oxide (SiOx) or aluminum oxide (Al$_2$O$_3$) and another resin layer are stacked on a resin film made of, for example, polyethylene terephthalate or the like, and has a thickness of, for example, 10 μm to 1,000 μm both inclusive.

The display panel 20 is obtained by, for example, sealing a liquid crystal layer between a TFT substrate on which TFTs (Thin Film Transistors), various drive circuits, pixel electrodes, and the like are formed and an opposed substrate on which color filters, opposed electrodes, and the like are formed (those components are not illustrated). On the light incidence side and the light emitting side of the display panel 4, polarization plates (not illustrated) are adhered so that their polarization axes are orthogonal to each other.

The diffusion film 16 diffuses incident light and uniformizes the intensity distribution. The lens film 17 is obtained by arranging, for example, a plurality of prism-shaped (triangle-pole-shaped) projections in the same plane, and has the function of condensing incident light, for example, in the front direction. The reflection-type polarization film 18 is provided to transmit one polarized light and reflect another polarized light downward (to the light source 12 side) so as to be reused. The reflection-type polarization film 18 is provided in order to increase light use efficiency.

2. Action and Effect of Display Device 1

In the embodiment, blue light emitted from the LED 12a passes through the diffusion plate 13 and enters the phosphor layer 14. In the phosphor layer 14, part of blue light entered is converted by the phosphor included in the phosphor layer 14 to, for example, red light, green light, or the like. That is, by mixture of the blue light which is not color-converted but passed through the phosphor layer 14 and color light obtained by color conversion in the phosphor layer 14, resultant light emits, for example, as white light upward of the phosphor layer 14.

The white light emitted from the phosphor layer 14 passes through the protection layer 15 and, after that, passes through the diffusion film 16, the lens film 17, and the reflection-type polarization film 18 in order, and illuminates the display panel 20. The illumination light is modulated on the basis of image data in the display panel 20, thereby displaying an image.

Figure 3:
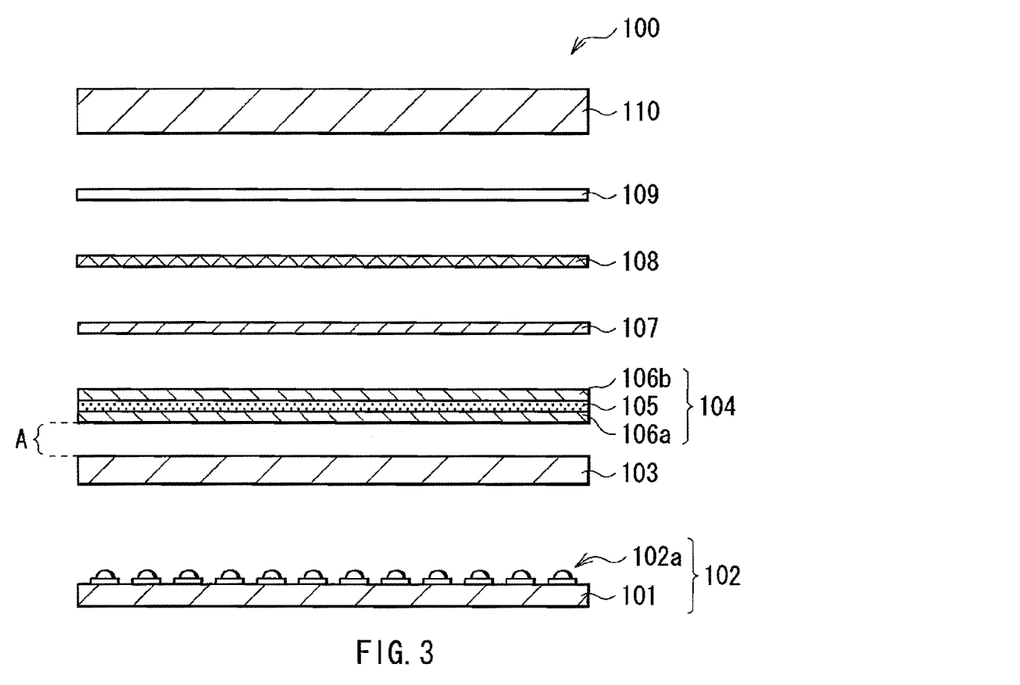
FIG. 3 is a schematic diagram illustrating a sectional configuration of a display device according to a comparative example.

Referring to FIG. 3, a display device 100 according to a comparative example of the embodiment will now be described. The display device 100 has, in order from a light source 102 obtained by arranging a plurality of LEDs 102a on a substrate 101, a diffusion plate 103, a phosphor sheet 104, a diffusion film 107, a lens film 108, a reflection-type polarization film 109, and a display panel 110. The phosphor sheet 104 is obtained by sandwiching a phosphor layer 105 for performing color conversion between a pair of films 106a and 106b. That is, between the light source 102 and the display panel 110, the phosphor sheet 104 as a member different from those optical members is disposed between the diffusion plate 103 and the diffusion film 107. Consequently, in the display device 100, an air layer A is interposed between the phosphor sheet 104 and adjacent another optical member, for example, the diffusion plate 103.

Therefore, in the display device 100 according to the comparative example, due to the interposition of the air layer A, the refractive index difference between the diffusion plate 103 and the air layer A and that between the air layer A and the phosphor sheet 104 become large in an optical path from the diffusion plate 103 to the phosphor sheet 104. As a result, light reflection in the interface easily occurs, and light loss occurs. For example, luminance efficiency of light which goes upward of the phosphor sheet 104 in the display device 100 was measured as 60%.

In contrast, in the embodiment, the phosphor layer 14 is provided integrally with the diffusion plate 13, concretely, directly on the light outgoing face of the diffusion plate 13, so that the air layer A as described above is not interposed between the phosphor layer 14 and the diffusion plate 13. That is, the refractive index difference between the phosphor layer 14 and the diffusion plate 13 is smaller than that in the case where the air layer A is interposed.

As described above, in the embodiment, the phosphor layer 14 is provided directly on the light emission face of the diffusion plate 13. Consequently, in a process that light passes from the diffusion plate 13 to the phosphor layer 14, light reflection in the interface is reduced as compared with the case where the air layer A is interposed. Therefore, occurrence of light loss with the phosphor layer 14 performing color conversion is suppressed. For example, the luminance efficiency of light which goes upward of the protection layer 15 was measured and found that it improves by about 15% as compared with the luminance efficiency (60%) in the comparative example. Thus, in the display device 1, reduction in luminance is suppressed.

By providing the phosphor layer 14 directly on the diffusion plate 13 having sufficient thickness, the diffusion plate 13 is made function as a protection layer of the phosphor layer 14. Generally, a phosphor is weak to moisture vapor, oxygen, and the like as described above, and, therefore, has to be sandwiched by the protection films 106a and 106b as in the comparative example or the like. With respect to the point, by making the diffusion plate 13 adjacent to the phosphor layer 14 thick as in the embodiment and making the diffusion plate 13 display the gas barrier property, deterioration in the phosphor layer 14 is suppressed, and one of the films 106a and 106b becomes unnecessary. That is, as compared with the comparative example, the number of parts between the diffusion plate 13 and the phosphor layer 14 becomes smaller, and the interface between members having different refractive indexes decreases. Therefore, light is prevented from being absorbed and reflected by other members during a period from emission from the diffusion plate 13 to incidence on the phosphor layer 14, and light loss is suppressed effectively.

Further, the member for protecting the phosphor layer 14 is reduced and the phosphor layer 14 is formed by printing or the like directly on an optical member (in this case, the diffusion plate 13) which is usually used in a liquid crystal display, so that the process is simplified, and the cost is reduced.

EXAMPLE 1

Figure 4:
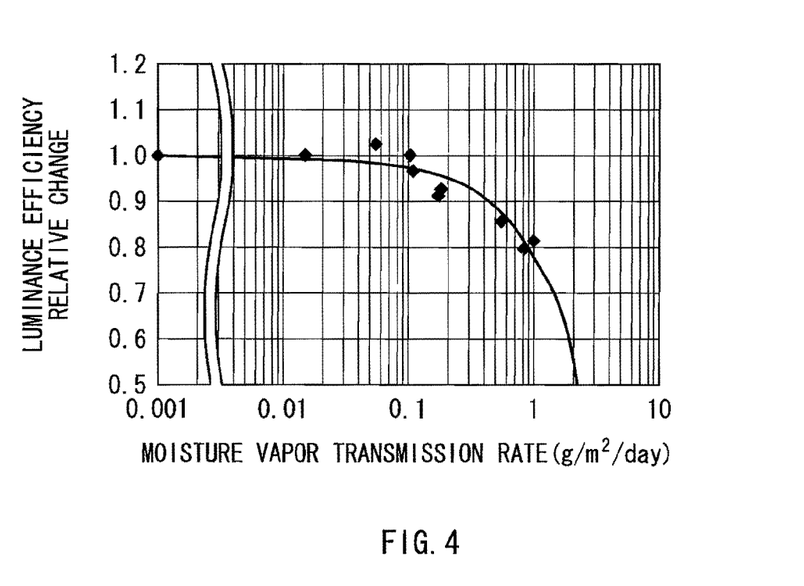
FIG. 4 is a diagram illustrating luminance efficiency with respect to the moisture vapor transmission rate according to example 1.

Next, as an example (example 1) of the foregoing first embodiment, an experiment on deterioration in the phosphor layer 14 was performed. Concretely, using a blue light emitting diode and the diffusion plate 13 on which the phosphor layer 14 was not directly formed, a change in the luminance efficiency with respect to the moisture vapor transmission rate ($g/m^2$/day) of the diffusion plate 13 was measured. FIG. 4 illustrates the result. It illustrates relative values in the case where a phosphor for red conversion whose deterioration is generally large under high-temperature and high-moisture environments was used for the phosphor layer 14, the initial luminance efficiency was set as 1, and the phosphor layer was left for 500 hours under the environment of 85 ° C. and 90% RH. It is understood from FIG. 4 that the higher the moisture vapor transmission rate in the diffusion plate 13 is, that is, the lower the moisture vapor barrier property is, the more deterioration in the phosphor is conspicuous and the more the luminance efficiency decreases. The acceleration factor in such an experiment is generally 70 or higher and corresponds to the degree of deterioration in the case where the phosphor layer 14 is used more than 35,000 hours in real environments. Generally, in the life characteristic of a backlight, a condition for assuring reliability is that time required for reduction by half of luminance is 30,000 hours or longer. That is, it is understood that when the moisture vapor transmission rate is 2 $g/m^2$/day or less, the reliability condition is satisfied.

Modifications (modifications 1 to 4) of the first embodiment will be described. In the following, the same reference numerals are designated to components similar to those of the first embodiment and their description will not be repeated.

Modification 1

Figure 5:
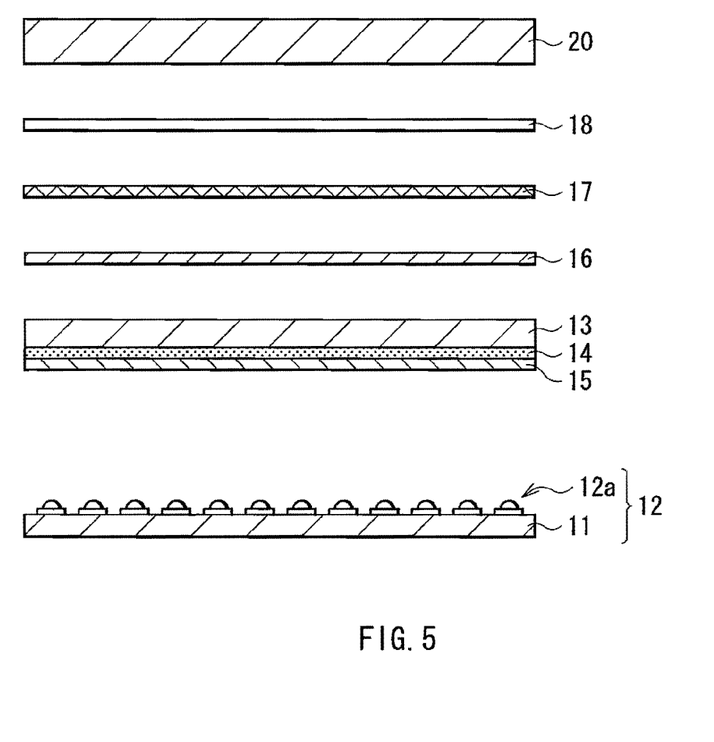
FIG. 5 is a schematic diagram illustrating a sectional configuration of a display device according to modification 1.

FIG. 5 schematically illustrates a sectional configuration of a display device according to modification 1. In the display device, in a stack structure between the light source 12 and the display panel 20, the phosphor layer 14 is provided directly on the light incidence surface of the diffusion plate 13, and the protection layer 15 is formed on the surface of the phosphor layer 14 in a manner similar to the first embodiment. On the light emitting side of the diffusion plate 13, the diffusion film 16, the lens film 17, and the reflection-type polarization film 18 are disposed.

In the modification, blue light emitted from the LED 12a passes through the protection layer 15 and, after that, is partly color-converted in the phosphor layer 14. As a result, white light is generated from the phosphor layer 14 and enters the diffusion plate 13 without passing through an air layer and other members. The light diffused by the diffusion plate 13 passes through the diffusion film 16, the lens film 17, and the reflection-type polarization film 18 in order and illuminates the display panel, thereby displaying an image. Therefore, effects similar to those of the first embodiment are obtained. That is, the face on which the phosphor layer 14 is formed in the diffusion plate 13 may be the light incidence face.

Modification 2

Figure 6A:
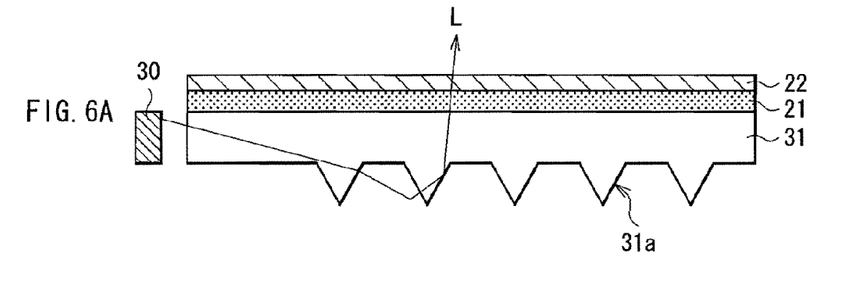
FIGS. 6A and 6B are schematic diagrams each illustrating a sectional configuration of an optical member according to modification 2.

FIG. 6A schematically illustrates a sectional structure of an optical member using a light guide plate 31 according to modification 2. The optical member is used, for example, as a backlight of a liquid crystal display or the like and is obtained by, for example, disposing an LED 30 on a side face of the light guide plate 31 having a parallel plate shape. In the modification, a phosphor layer 21 is provided directly on the top face (light outgoing face) of the light guide plate 31. A protection layer 22 is formed on the surface of the phosphor layer 21. The phosphor layer 21 contains a phosphor that converts a color light to color light having a longer wavelength band. The phosphor layer 21 uses a phosphor similar to that of the phosphor layer 14 in the first embodiment and is formed by printing or applying the phosphor directly on the light outgoing face of the light guide plate 31. The protection layer 22 is made of a material similar to that of the protection layer 15 of the first embodiment. The LED 30 is, for example, a blue light emitting diode. The light guide plate 31 and the phosphor layer 21 which are formed integrally correspond to an example of optical members of the present invention.

The material of the light guide plate 31 is similar to that of the diffusion plate 13 of the first embodiment and is, for example, a thermoplastic resin such as polycarbonate, polyethylene terephthalate, polyethylene naphthalate, polystyrene, polyether sulfone, cyclic amorphous polyolefin, or the like, polyfunctional acrylate, polyfunctional polyolefin, unsaturated polyester, epoxy resin, or the like. The thickness of the light guide plate 31 is, for example, about 0.5 mm to 5 mm both inclusive. Like the diffusion plate 13 of the first embodiment, the light guide plate 31 also displays the optical function by its sufficient thickness and also the function of the protection layer of the phosphor layer 21.

On the bottom face (face opposite to the light outgoing face) of such a light guide plate 31, for example, a plurality of grooves 31a are formed as a work for light extraction. By the grooves 31a, the total reflection condition of light propagating in the light guide plate 31 is unsatisfied (the angle becomes less than the critical angle) and the light is emitted from the top of the light guide plate 31.

In the modification, when blue light emitted from the LED 30 enters the inside of the light guide plate 31, the blue light propagates in the light guide plate 31 by total reflection and, after that, is emitted from the top of the light guide plate 31 by the groove 31a. The blue light emitted from the light guide plate 31 enters the phosphor layer 21 and is partly color-converted by the phosphor contained in the phosphor layer 21. As a result, by mixture of the blue light passed through the phosphor layer 21 without being color converted and color light subjected to the color conversion of the phosphor, for example, white light is obtained. Since no air layer is interposed between the light guide plate 31 and the phosphor layer 21, light reflection in the interface is suppressed. By making the light guide plate 31 function as a protection layer of the phosphor layer 21, the number of parts decreases and the interface between layers having different refractive indexes decreases. Therefore, the base member on which the phosphor layer 21 is formed is not limited to the diffusion plate 13 in the first embodiment but may be the light guide plate 31. In such a case as well, effects equivalent to those of the first embodiment are obtained.

Figure 6B:
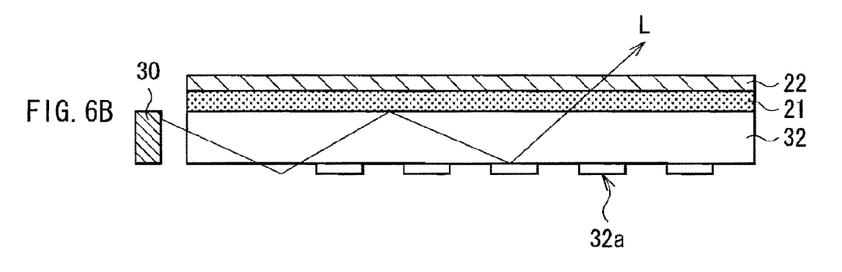

The light extracting work in the light guide plate 31 is not limited to the grooves 31a. For example, as illustrated in FIG. 6B, a light guide plate 32 having a bottom face on which a plurality of dots 32a are printed may be used.

Modification 3

Figure 7A:
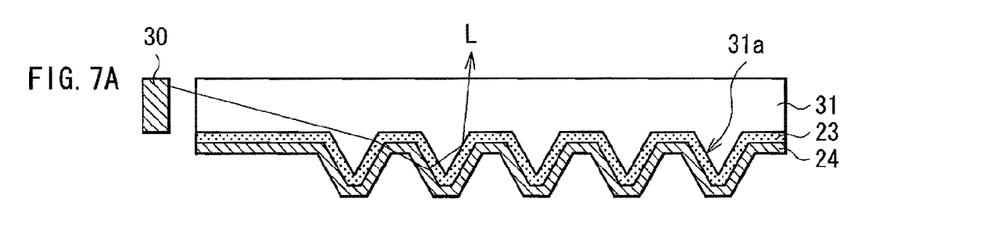
FIGS. 7A and 7B are schematic diagrams each illustrating a sectional configuration of an optical member according to modification 3.

FIG. 7A schematically illustrates a sectional structure of an optical member using the light guide plate 31 according to modification 3. In the optical member, in a manner similar to the modification 2, the LED 30 is disposed on a side face of the light guide plate 31, and a plurality of grooves 31a are formed in the bottom face (face opposed to the light outgoing face). In the modification, a phosphor layer 23 is provided directly on the bottom face of the light guide plate 31. The phosphor layer 23 contains a phosphor that converts a color light to color light having a longer wavelength band. The phosphor layer 23 uses a phosphor similar to that of the phosphor layer 14 in the first embodiment and is formed by printing or applying the phosphor directly on the bottom face of the light guide plate 31. The protection layer 24 is made of a material similar to that of the protection layer 15 of the first embodiment. The light guide plate 31 also has the function of the protection layer of the phosphor layer 23 by the thickness in a manner similar to the modification 2.

In the modification, a part of the blue light propagating in the light guide plate 31 passes through the phosphor layer 23, is color-converted when the total reflection condition is unsatisfied by the groove 31a, and is emitted upward of the light guide plate 31. As a result, from the top of the light guide plate 31, white light is extracted by the color mixture.

Figure 7B:
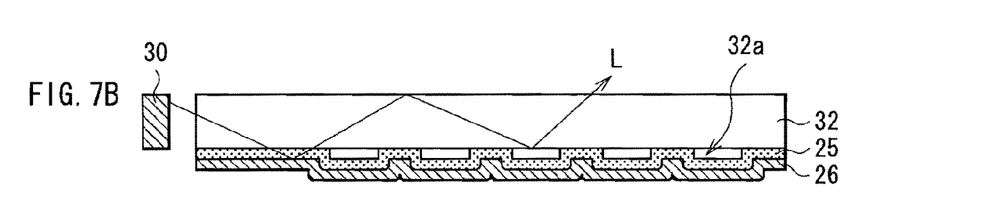

The phosphor layer 23 may be provided directly on the bottom face of the light guide plate 31 as described above. In this case as well, effects equivalent to those of the first embodiment are obtained. In the modification as well, the light extraction work is not limited to the groove 31a but may be the dots 32a printed on the bottom face of the light guide plate 32 as illustrated in FIG. 7B.

Modification 4

Figure 8A:
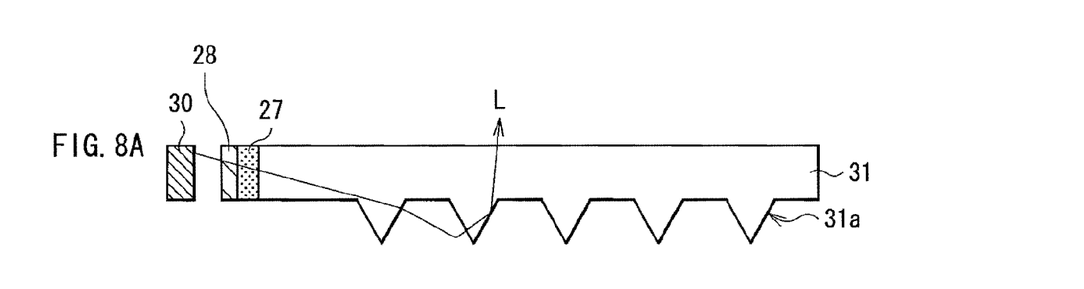
FIGS. 8A and 8B are schematic diagrams each illustrating a sectional configuration of an optical member according to modification 4.

FIG. 8A schematically illustrates a sectional structure of an optical member using the light guide plate 31 according to modification 4. In the optical member, in a manner similar to the modification 2, the LED 30 is disposed on a side face of the light guide plate 31, and the plurality of grooves 31a are formed in the bottom face. In the modification, a phosphor layer 27 is provided directly on the light incidence face (the side face along which the LED 30 is disposed) of the light guide plate 31. The phosphor layer 27 contains a phosphor that converts a color light to color light having a longer wavelength band. The phosphor layer 27 uses a phosphor similar to that of the phosphor layer 14 in the first embodiment and is formed by printing or applying the phosphor directly on the side face of the light guide plate 31. A protection layer 28 is made of a material similar to that of the protection layer 15 of the first embodiment. In the modification as well, the light guide plate 31 has the function of the protection layer of the phosphor layer 27.

In the modification, a part of the blue light emitted from the LED 30 is color-converted in the phosphor layer 27 before it enters the light guide plate 31. Color light obtained by the color conversion and the blue light passed through the phosphor layer 27 without being color converted propagates in the light guide plate 31 and is extracted as white light from the top of the light guide plate 31.

Figure 8B:
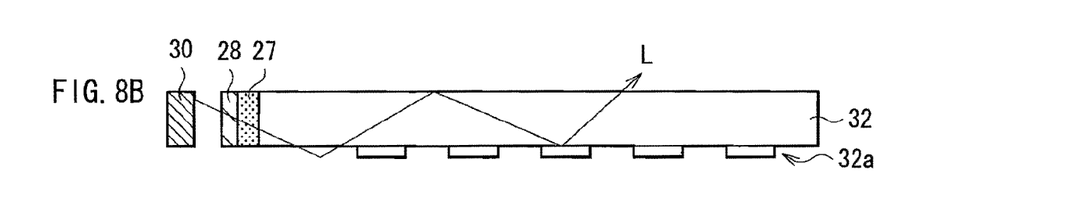

In such a manner, the phosphor layer 27 may be provided on the light incidence face of the light guide plate 31. In this case as well, effects equivalent to those of the first embodiment are obtained. In the modification as well, the light extraction work is not limited to the groove 31a but may be the dots 32a printed on the bottom face of the light guide plate 32 as illustrated in FIG. 8B.

In the modifications 2 to 4, the light guide plate 31 having the parallel plate shape has been described as an example. The shape of the light guide plate 31 is not limited to the parallel plate shape but may be another shape such as a wedge shape.

Second Embodiment

1. Configuration of Display Device 2

Figure 9:
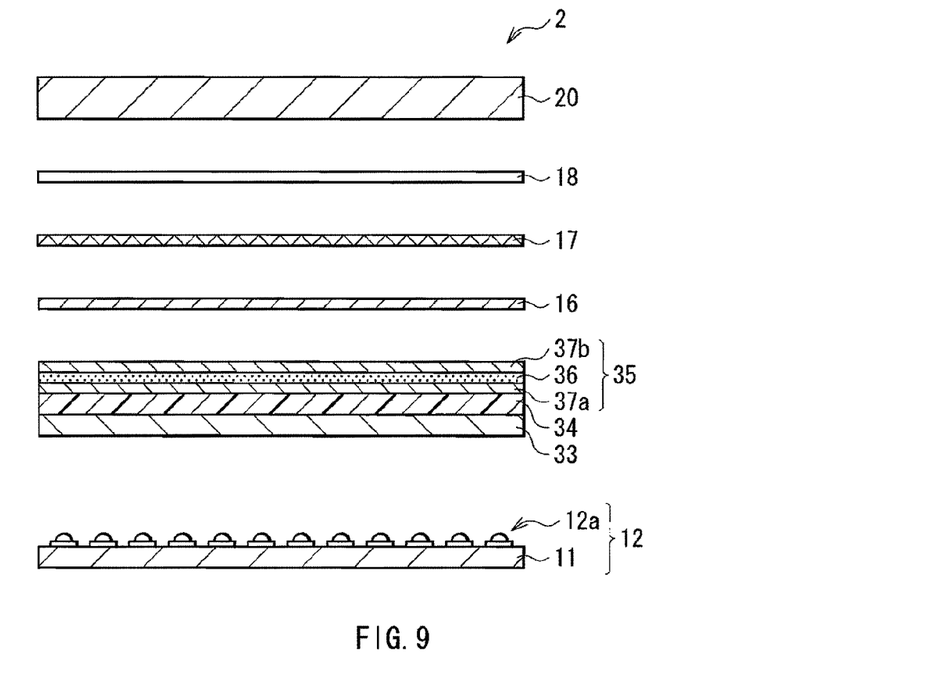
FIG. 9 is a schematic diagram illustrating a sectional configuration of a display device according to a second embodiment.

FIG. 9 schematically illustrates a sectional configuration of a display device 2 according to a second embodiment. The display device 2 is, for example, a liquid crystal display or the like and has the display panel 20 and the light source 12 as a backlight for illuminating the display panel 20. Between the display panel 20 and the light source 12, a diffusion plate 33 (base member), a phosphor sheet 35, the diffusion film 16, the lens film 17, and the reflection-type polarization film 18 are stacked in order from the side of the light source 12. In such a stack structure, the phosphor sheet 35 is adhered to the light emitting surface of the diffusion plate 33 by an adhesive layer 34. The diffusion plate 33 and a phosphor layer 36 formed integrally by the adhesive layer 34 correspond to examples of the optical member of the present invention. In the following, the same reference numerals are designated to components similar to those of the first embodiment and their description will not be repeated.

In a manner similar to the diffusion plate 13 of the first embodiment, the diffusion plate 33 diffuses incident light to uniformize intensity distribution. The material and the thickness of the diffusion plate 33 are also similar to those of the diffusion plate 13 of the first embodiment.

The adhesive layer 34 is made of a material parallel to visible light such as vinyl acetate resin, epoxy resin, urethane resin, acrylic resin, or the like and its thickness is, for example, 1 μm to 100 μm both inclusive. At the time of forming the adhesive layer 34, an adhesive, an adhesive sheet, a gel, or the like containing the above-described resin is used.

The phosphor sheet 35 is obtained by sandwiching the phosphor layer 36 containing a phosphor that converts incident color light to color light having a longer wavelength band by two films 37a and 37b. The phosphor contained in the phosphor layer 36 is similar to that contained in the phosphor layer 14 of the first embodiment.

The films 37a and 37b support the phosphor layer 36 and also function as the protection layers of the phosphor layer 36. Examples of the material of the films 37a and 37b include, for example, polyethylene terephthalate, polyethylene naphthalate, and the like and also a material having a property capable of controlling transmittance such as moisture vapor and sulfidizing gas. The thickness of the films 37a and 37b is, of example, 10 μm to 1000 μm both inclusive. By the two films 37a and 37b, permeability of gas to the phosphor layer 36 is controlled, and deterioration in the phosphor layer 36 is suppressed.

For example, such a phosphor sheet 35 is formed as follows. That is, first, a material obtained by mixing the phosphor in the solvent is printed on one surface of the film 37a and dried. After that, using an adhesive or the like, the other film 37b is adhered to the film 37a so as to sandwich the phosphor layer 36. In such a manner, the phosphor sheet 35 is formed.

At the time of adhering the phosphor sheet 35 to the diffusion plate 33, for example, the adhesion layer 34 made of the above-described material is formed on one surface of the diffusion plate 33. After that, the phosphor sheet is overlaid on the adhesion layer 34, and the adhesion layer 34 is cured. As a result, the gap between the phosphor sheet 35 and the diffusion plate 33 is filled with the adhesion layer 34.

2. Action and Effect of Display Device 2

In the embodiment, blue light emitted from the LED 12a passes through the diffusion plate 33 and, after that, enters the phosphor sheet 35 via the adhesive layer 34. In the phosphor sheet 35, incident blue light passes through the film 37a and a part of the light is color-converted by the phosphor included in the phosphor layer 36 to, for example, red light, green light, or the like. That is, by mixture of the blue light which is not color-converted but passed through the phosphor layer 36 and color light obtained by color conversion in the phosphor layer 36, resultant light is extracted, for example, as white light upward of the phosphor sheet 35. The white light emitted from the phosphor sheet 35 passes through the diffusion film 16, the lens film 17, and the reflection-type polarization film 18 in order, and illuminates the display panel 20. The illumination light is modulated on the basis of image data in the display panel 20, thereby displaying an image.

In the display device 100 according to the comparative example illustrated in FIG. 3, the air layer A is interposed between the diffusion plate 103 and the phosphor sheet 104, so that the refractive index difference in the optical path from the diffusion plate 103 to the phosphor sheet 104 becomes large. As a result, light reflection in the interface easily occurs, and light loss occurs.

In contrast, in the embodiment, the phosphor sheet 35 having the phosphor layer 36 is adhered to the light outgoing face of the diffusion plate 33 by the adhesive layer 34, so that the gap between the phosphor sheet 35 and the diffusion plate 33 is filled with the adhesive layer 34. That is, the refractive index difference between the diffusion plate 33 and the adhesive layer 34 and that between the adhesive layer 34 and the phosphor sheet 35 are smaller than that in the case where the air layer A is interposed.

As described above, in the embodiment, the adhesive layer 34 is provided between the phosphor sheet 35 and the diffusion plate 33. Consequently, in a process that light passes from the diffusion plate 33 to the phosphor sheet 35, light reflection in the interface and diffusion accompanying the light reflection is reduced as compared with the case where the air layer A is interposed. Therefore, occurrence of light loss with the phosphor sheet 35 performing color conversion is suppressed.

Figure 10:
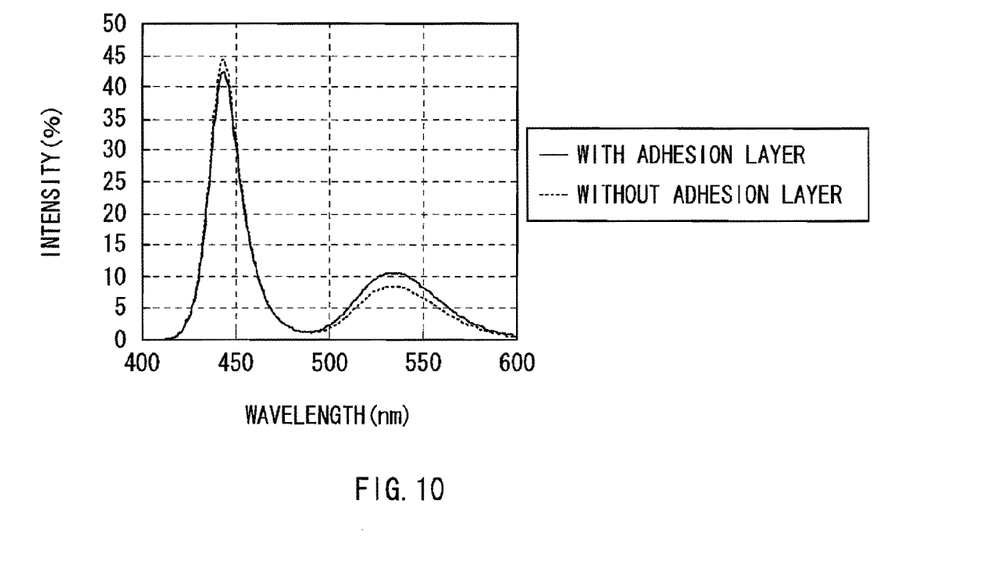
FIG. 10 is a diagram illustrating emission spectra in the second embodiment and a comparative example.

For example, the luminance efficiency of light which is emitted from the top of the phosphor sheet 35 was measured and found that it improved by about 25% as compared with the luminance efficiency (60%) in the comparative example. FIG. 10 illustrates emission spectra in the case where the adhesion layer 34 is provided between the diffusion plate 33 and the phosphor sheet 35 ("with adhesion layer") as an example and the case where the air layer A is interposed between the diffusion plate 103 and the phosphor sheet 104 ("without adhesion layer") as a comparative example. The light emission intensity (%) is normalized with the spectrum peak of excitation light (blue light).

Modifications (modifications 5 and 6) of the second embodiment will now be described. In the following, the same reference numerals are designated to components similar to those of the second embodiment and their description will not be repeated.

Modification 5

Figure 11:
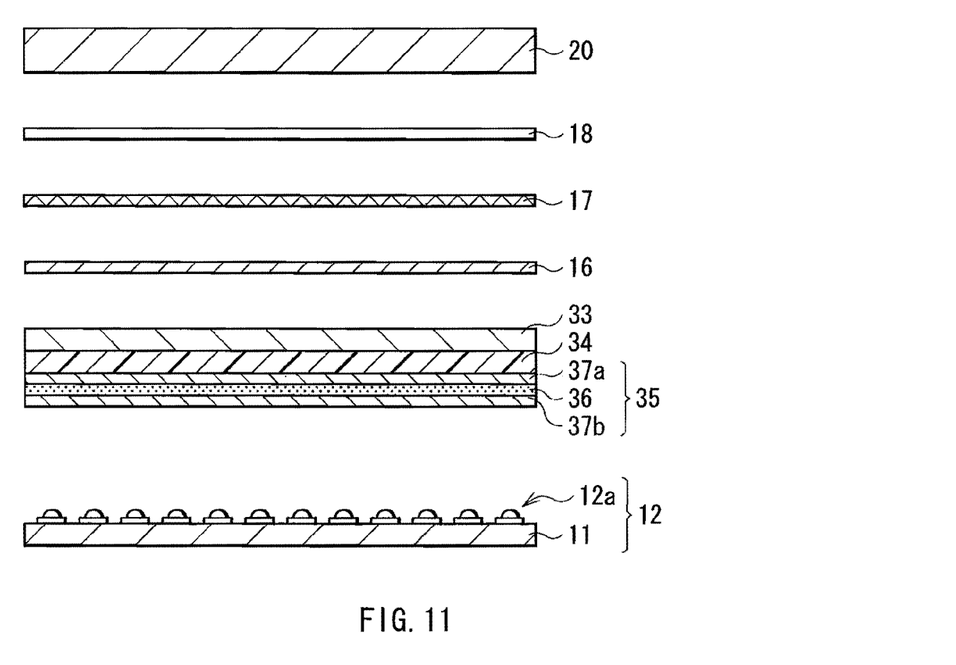
FIG. 11 is a schematic diagram illustrating a sectional configuration of a display device according to modification 5.

FIG. 11 schematically illustrating a sectional configuration of a display device according to modification 5. In the display device, in a stack structure between the light source 12 and the display panel 20, the phosphor sheet 35 is provided for the light incidence surface of the diffusion plate 33 via the adhesive layer 34. On the light emitting side of the diffusion plate 33, the diffusion film 16, the lens film 17, and the reflection-type polarization film 18 are disposed.

In the modification, blue light emitted from the LED 12a enters first the phosphor sheet 35 in which a part of the blue light is color-converted. As a result, white light is generated from the phosphor sheet 35 and enters the diffusion plate 33 without passing through an air layer. The light diffused by the diffusion plate 33 passes through the diffusion film 16, the lens film 17, and the reflection-type polarization film 18 in order and illuminates the display panel, thereby displaying an image. Therefore, effects similar to those of the second embodiment are obtained. That is, the face on which the phosphor sheet 35 of the diffusion plate 33 is adhered may be the light incidence face.

In the second embodiment and the modification 5, the diffusion plate 33 has been described as an example of the base member on which the phosphor sheet 35 is adhered. However, the base member is not limited to the diffusion plate 33 but may be another optical member. For example, the diffusion film 16, the lens film 17, the reflection polarization film 18, or the like in the display device 2 may be used as the base member. Also in the case of adhering the phosphor sheet 35 to any of the base members, the phosphor sheet 35 is protected by the films 37a and 37b as described above. Consequently, deterioration in the phosphor layer 36 is suppressed. That is, as compared with the first embodiment and the modifications 1 to 4, selectivity of the base member to which the phosphor sheet 35 is adhered is higher. In the case of adhering the phosphor sheet 35 to the lens film 17 or the reflection polarization film 18, there is the possibility that the optical path is disturbed. It is therefore desirable to adhere the phosphor sheet 35 to the diffusion plate 33 or the diffusion film 16.

Modification 6

Figure 12A:
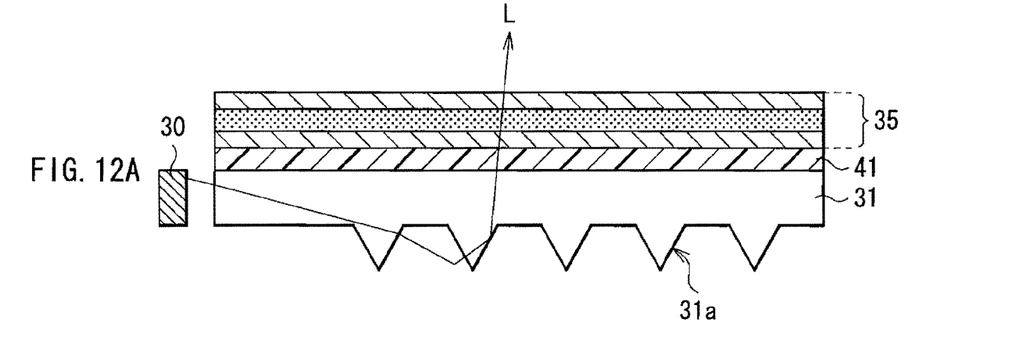
FIGS. 12A and 12B are schematic diagrams each illustrating a sectional configuration of an optical member according to modification 6.
Figure 12B:
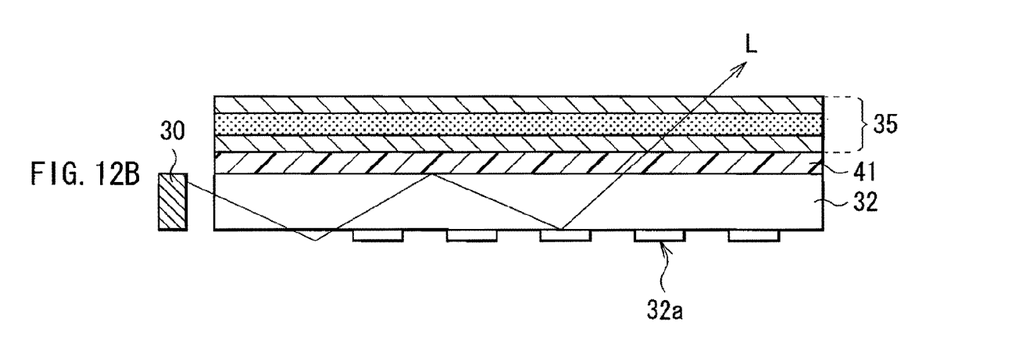

FIGS. 12A and 12B schematically illustrate a sectional structure of an optical member using the light guide plate 31 according to modification 6. The optical member is used, for example, as a backlight of a liquid crystal display or the like. For example, the LED 30 is disposed for a side face of the light guide plate 31 (base member) having a parallel plate shape. In the modification, the phosphor sheet 35 is adhered to the top face (light outgoing face) of the light guide plate 31 with an adhesive layer 41 in between. The LED 30 is, for example, a blue light emitting diode. The adhesive layer 41 is formed with a material and a thickness similar to those of the adhesive layer 34 of the second embodiment. The light guide plate 31 and the phosphor sheet 35 formed integrally by the adhesive layer 41 correspond to an optical member of the present invention.

When blue light emitted from the LED 30 enters the inside of the light guide plate 31, the blue light propagates in the light guide plate 31 by total reflection and is emitted upward of the light guide plate 31. The blue light emitted from the light guide plate 31 passes through the adhesive layer 41 and enters the phosphor sheet 35. In the phosphor sheet 35, a part of the blue light is color-converted by the phosphor contained in the phosphor layer 36. As a result, white light is obtained from the top of the phosphor sheet 35. Since no air layer is interposed between the light guide plate 31 and the phosphor sheet 35, light reflection by the interface is suppressed. Therefore, the base member to which the phosphor sheet 35 is adhered is not limited to the diffusion plate 33 or the like in the second embodiment but may be the light guide plate 31. In such a case as well, effects similar to those of the second embodiment is obtained.

The light extracting work in the light guide plate 31 is not limited to the above-described grooves 31a. For example, as illustrated in FIG. 12B, a light guide plate 32 having a bottom face on which a plurality of dots 32a are printed may be used. The surface to which the phosphor sheet 35 is adhered in the light guide plate 31 is not limited to the light outgoing face but may be a side face (light incidence face) or the bottom face (face opposed to the light outgoing face).

The embodiments and modifications of the present invention have been described above. The present invention is not limited to the embodiments and the like but may be variously modified. For example, although the configuration using the blue light emitting diode as an LED has been described as an example, a light source that emits color light having a relatively short wavelength band such as a near-ultraviolet light emitting diode may be used. In this case, as a phosphor for green conversion or yellow conversion, $(Ca, Sr, Ba)_2SiO_4$: $Eu^{2+}$, $BAM:Eu^{2+}$, $Mn^{2+}$, $\alpha$-$SiAlON:Eu^{2+}$, or the like may be used. As a phosphor of red conversion, $Y_2O_2S:Eu^{3+}$, $La_2O_2S$: $Eu^{3+}$, $(Ca, Sr, Ba)_2Si_5N_8:Eu^{2+}$, $CaAlSiN_3:Eu^{2+}$, $LiEuW_2O_8$, $Ca(Eu, La)_4Si_3O_{13}$, $Eu_2W_2O_9$-based material, $(La, Eu)_2W_3O_{12}$, $(Ca, Sr, Ba)_3MgSi_2O_8:Eu^{2+}$, $Mn^{2+}$, $CaTiO_3$: $Pr^{3+}$, $Bi^{3+}$, or the like may be used. As a phosphor of blue conversion, $BAM:Eu^{2+}$, $(Ca, Sr, Ba)_5(PO_4)_3Cl:Eu^{2+}$ or the like may be used. From the viewpoint of luminance efficiency and weather resistance, it is preferable to use a blue light emitting diode.

Further, in the embodiments, the configuration using the liquid crystal display as the display device of the present invention has been described as an example. However, the present invention is not limited to the liquid crystal display but may be applied also to other display devices.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A display device comprising:
a light source;
an optical member transmitting light emitted from the light source;
a display panel displaying an image by using the light passed through the optical member; and
a diffusion film, a lens film, and a reflection-type polarization film provided in order from the optical member between the optical member and the display panel,
wherein the optical member comprises:
a diffusion plate having two opposed surfaces,
a phosphor layer provided directly on one of the two opposed surfaces of the diffusion plate and containing a phosphor that converts a color light emitted from the light source to another color light, and a protection layer provided on a surface of the phosphor layer opposite to the diffusion plate,
wherein the phosphor layer is made of cycloolefin resin and the protection layer is made of a material having gas barrier property.

* * * * *